(12) United States Patent
Osawa et al.

(10) Patent No.: US 12,047,937 B2
(45) Date of Patent: Jul. 23, 2024

(54) USER DEVICE AND BASE STATION DEVICE

(71) Applicant: NTT DOCOMO, INC., Tokyo (JP)

(72) Inventors: Ryosuke Osawa, Tokyo (JP); Huan Wang, Beijing (CN); Xufei Zheng, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 17/259,804

(22) PCT Filed: Jul. 19, 2018

(86) PCT No.: PCT/JP2018/027195
§ 371 (c)(1),
(2) Date: Jan. 12, 2021

(87) PCT Pub. No.: WO2020/017012
PCT Pub. Date: Jan. 23, 2020

(65) Prior Publication Data
US 2021/0307032 A1    Sep. 30, 2021

(51) Int. Cl.
*H04W 72/12* (2023.01)
*H04W 72/1263* (2023.01)
(Continued)

(52) U.S. Cl.
CPC ....... *H04W 72/1263* (2013.01); *H04W 72/23* (2023.01); *H04W 72/569* (2023.01); *H04W 4/40* (2018.02)

(58) Field of Classification Search
None
See application file for complete search history.

(56) References Cited

U.S. PATENT DOCUMENTS

2017/0041902 A1    2/2017 Sheng
2018/0035332 A1    2/2018 Agiwal et al.
(Continued)

FOREIGN PATENT DOCUMENTS

EP           3826406 A1 *  5/2021   ........ H04W 72/1242
WO   WO-2014187174 A1 * 11/2014   ........ H04W 72/0406
(Continued)

OTHER PUBLICATIONS

International Search Report issued in Application No. PCT/JP2018/027195, mailed on Oct. 2, 2018 (5 pages).
(Continued)

*Primary Examiner* — Kodzovi Acolatse
(74) *Attorney, Agent, or Firm* — Osha Bergman Watanabe & Burton LLP

(57) ABSTRACT

A user device includes a transmission unit that transmits a first traffic to a second user device using a resource scheduled for sidelink by a base station device or a first user device, a reception unit that receives from the base station device or the first user device a sidelink pre-emption indication indicating that all or part of the resource scheduled for the sidelink is to be used for a second traffic, and a control unit that excludes a resource used for the second traffic from the resource for the sidelink used for transmitting the first traffic, based on the sidelink pre-emption indication.

2 Claims, 15 Drawing Sheets

(51) Int. Cl.
*H04W 72/23* (2023.01)
*H04W 72/566* (2023.01)
*H04W 4/40* (2018.01)

(56) References Cited

U.S. PATENT DOCUMENTS

| | | | |
|---|---|---|---|
| 2018/0042030 A1* | 2/2018 | Xu | H04W 28/0215 |
| 2018/0063865 A1* | 3/2018 | Islam | H04L 5/0091 |
| 2018/0234220 A1* | 8/2018 | Yasukawa | H04W 72/04 |
| 2019/0239193 A1* | 8/2019 | Rudolf | H04L 29/08306 |
| 2019/0261234 A1* | 8/2019 | Park | H04W 36/0072 |
| 2020/0008258 A1* | 1/2020 | Li | H04W 52/10 |
| 2020/0037343 A1* | 1/2020 | He | H04W 72/0446 |
| 2020/0127763 A1 | 4/2020 | Yasukawa et al. | |
| 2021/0176758 A1* | 6/2021 | Bae | H04L 1/1819 |
| 2021/0219320 A1* | 7/2021 | Belleschi | H04W 76/14 |
| 2022/0095200 A1* | 3/2022 | Hosseini | H04W 72/1242 |
| 2022/0174649 A1* | 6/2022 | Ashraf | H04W 72/20 |

FOREIGN PATENT DOCUMENTS

| | | | | |
|---|---|---|---|---|
| WO | WO-2016024890 A1 * | 2/2016 | | H04L 47/745 |
| WO | WO-2017026511 A1 * | 2/2017 | | H04J 11/00 |
| WO | WO-2017026973 A1 * | 2/2017 | | H04W 72/02 |
| WO | WO-2018093126 A1 * | 5/2018 | | H04W 24/08 |
| WO | 2018/123956 A1 | 7/2018 | | |
| WO | WO-2019160788 A1 * | 8/2019 | | H04W 72/10 |
| WO | WO-2019170084 A1 * | 9/2019 | | H04L 5/0048 |
| WO | WO-2019199515 A1 * | 10/2019 | | H04L 1/0041 |
| WO | WO-2020057755 A1 * | 3/2020 | | H04L 1/1812 |

OTHER PUBLICATIONS

Written Opinion issued in International Application No. PCT/JP2018/027195, mailed on Oct. 2, 2018 (4 pages).
3GPP TS 36.211 V15.1.0, Release 15; "3rd Generation Partnership Project; Technical Specification Group Radio Access Network; Evolved Universal Terrestrial Radio Access (E-UTRA); Physical channels and modulation;" Mar. 2018; Sophia Antipolis Valbonne, France (221 pages).
3GPP TR 22.886 V15.1.0, Release 15; "3rd Generation Partnership Project; Technical Specification Group Services and System Aspects; Study on enhancement of 3GPP Support for 5G V2X Services;" Mar. 2017; Sophia Antipolis Valbonne, France (58 pages).
3GPP TSG RAN WG1 Meeting #90; R1-1714264; "Discussion on resource reservation for URLLC;" ETRI; Aug. 21-25, 2017; P.R. Czechia (4 pages).
Extended European Search Report issued in counterpart European Patent Application No. 18926890.7, mailed on Feb. 11, 2022 (9 pages).
Vivo; "Multiplexing data with different transmission durations"; 3GPP TSG RAN WG1 Meeting AH 1801, R1-1800205; Vancouver, Canada; Jan. 22-26, 2018 (6 pages).
Office Action issued in the counterpart Chinese Application No. 201880095600.7, mailed Dec. 14, 2023 (14 pages).
NTT Docomo, Inc.; "On DL dynamic multiplexing of eMBB and URLLC"; 3GPP TSG RAN WG1 Meeting #88bis, R1-1705753; Spokane, USA; Apr. 3-7, 2017 (4 pages).
Office Action issued in counterpart European Patent Application No. 18 926 890.7 mailed on Mar. 7, 2024 (7 pages).

* cited by examiner

USER DEVICE AND BASE STATION DEVICE

TECHNICAL FIELD

The present invention relates to a user device (user apparatus) and a base station device (base station apparatus) in a radio communication system.

BACKGROUND ART

In LTE (Long Term Evolution) and successor systems of the LTE (for example, LTE Advanced (LTE-A), New Radio (NR) (also referred to as 5G)), D2D (Device to Device, device-to-device communication) technology has been discussed in which user devices directly communicate with each other without going through a base station (e.g., Non-patent Document 1).

D2D reduces traffic between the user device and the base station device, or enables communication between the user devices even in the case where communication with the base station device is not possible in the event of a disaster or the like. In 3GPP (3rd Generation Partnership Project), D2D is referred to as "sidelink", however the more general term D2D is used herein. However, in the description of the embodiments described below, the sidelink is also used as necessary.

D2D is roughly classified into D2D discovery for discovering other communicable user devices and D2D communication (also referred to as D2D direct communication, inter-terminal direct communication, and the like) for performing direct communication between the user devices. Hereinafter, when D2D communication, D2D discovery, and the like are not particularly distinguished from each other, these are simply referred to as D2D. In addition, hereinafter, a signal transmitted and received by D2D is referred to as a D2D signal. Various use cases of a V2X (Vehicle to Everything) service in NR have been studied (e.g. Non-Patent Document 2).

CITATION LIST

Non-Patent Document

Non-patent Document 1: 3GPP TS 36.211 V15.1.0 (2018-03)
Non-patent Document 2: 3GPP TR 22.886 V15.1.0 (2017-03)

SUMMARY OF THE INVENTION

Problem to be Solved by the Invention

In D2D communication in NR, ultra-high reliable and low-delay traffic by URLLC (Ultra-Reliable and Low Latency Communications) along with high-speed and high-capacity traffic by eMBB (enhanced Mobile Broadband) are assumed. However, there was insufficient consideration for a use case where eMBB traffic and URLLC traffic overlap in the sidelink.

The present invention has been made in view of the above-described points, and the object of the present invention is to indicate information pertaining to scheduling according to the traffic type in inter-terminal direct communication.

Means to Solve the Problem

According to the disclosed technique, it is provided a user device comprising a transmission unit that transmits a first traffic to a second user device using a resource scheduled for sidelink from a base station device or a first user device, a reception unit that receives from the base station device or the first user device a sidelink pre-emption indication indicating that all or part of the resource scheduled for the sidelink is to be used for a second traffic, and a control unit that excludes a resource used for the second traffic from a resource of the sidelink used for transmitting the first traffic, based on the sidelink pre-emption indication.

Advantage of the Invention

With the disclosed technology, in inter-terminal direct communication, information pertaining to scheduling according to the traffic type can be indicated.

MODE FOR CARRYING OUT THE INVENTION

Figure 1:
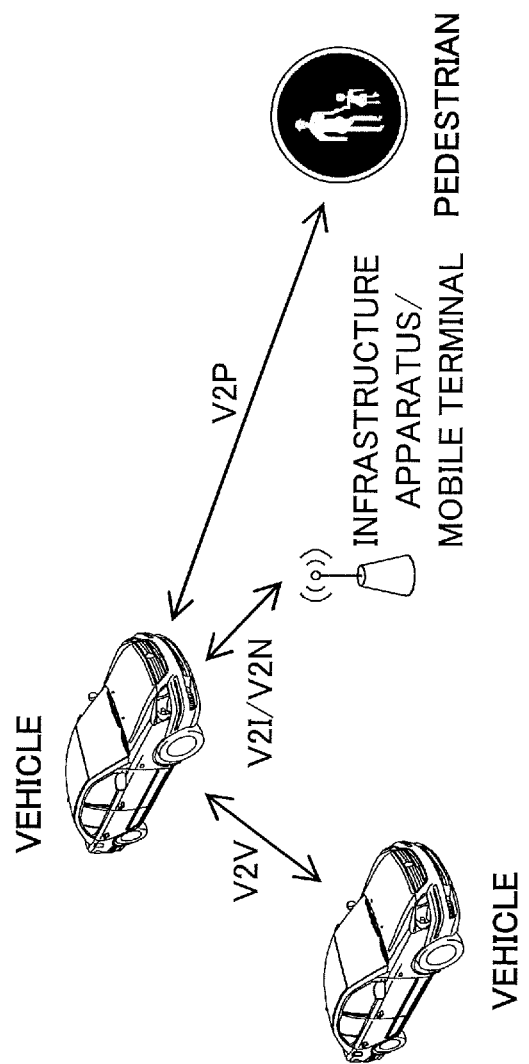
FIG. 1 is a diagram illustrating V2X.

Hereinafter, an embodiment of the present invention will be described with reference to the drawings. It is noted that the embodiments described below are merely one example, and embodiments to which the present invention is applied are not limited to the following embodiment.

In the operation of a radio communication system of an embodiment of the present invention, existing techniques are optionally used. Here, the existing technology is, for example, an existing LTE, however it is not limited to the existing LTE. Also, the term "LTE" as used herein, unless otherwise stated, shall have a broad meaning that includes LTE-Advanced and subsequent methods (e.g., NR) of the LTE-Advanced.

In the embodiment of the present invention, a duplex method may be a TDD (Time Division Duplex) method, a FDD (Frequency Division Duplex) method, or any other method (e.g., Flexible Duplex, etc.).

In addition, in the following description, the method of transmitting a signal using a transmission beam may be digital beam forming in which a precoding-vector-multiplied (precoded-by-precoding-vector) signal is transmitted, or analog beam forming in which beam forming is achieved using a variable phase shifter in an RF (Radio Frequency) circuit. Similarly, the method of receiving a signal using a reception beam may be digital beam forming which multiplies the reception signal by a predetermined weight vector, or analog beam forming which achieves beam forming using a variable phase controller in the RF circuit. Hybrid beam forming combining the digital beam forming and the analog beam forming may be applied. Transmitting the signal using the transmission beam may mean that the signal is being transmitted at a particular antenna port. Similarly, receiving the signal using the reception beam may mean that the signal is being received at a particular antenna port. The antenna port refers to a logical antenna port or physical antenna port defined in the 3GPP standard. The above precoding or beam forming may be also referred to as a precoder or a spatial domain filter or the like.

The method of forming the transmission and reception beams is not limited to the above-described method. For example, in a base station device 10 or user device 20 comprising a plurality of antennas, a method of varying the angle of each antenna may be used, a method of combining a method of using a precoding vector and a method of varying the angle of the antenna may be used, a method of switching and using different antenna panels may be used, a method for combining methods of using multiple antenna panels may be used, or other methods may be used. In addition, for example, multiple different transmission beams may be used in a high frequency band. The use of multiple transmission beams is called a multibeam operation, and the use of a single transmission beam is called a single beam operation.

In addition, in an embodiment of the present invention, a radio parameter or the like being "configured" may mean that a predetermined value is pre-configured, or a radio parameter indicated by the base station device 10 or the user device 20 is configured.

FIG. 1 is a diagram for explaining V2X. In 3GPP, realizing V2X (Vehicle to Everything) or eV2X (enhanced V2X) by extending the D2D function has been studied, and the specification is under way. As shown in FIG. 1, V2X is a part of the Intelligent Transport Systems (ITS) and is a generic term for V2V (Vehicle to Vehicle) (ITS) which means a form of communication between vehicles, V2I (Vehicle to Infrastructure) which means a form of communication between a vehicle and a roadside unit (RSU) installed on a roadside, V2N (Vehicle to Nomadic device) which means a form of communication between a vehicle and a mobile device owned by a driver, and V2P (Vehicle to Pedestrian) which means a form of communication between a vehicle and a mobile device carried by a pedestrian.

In addition, V2X using cellular communication and inter-terminal communication of LTE or NR has been studied in 3GPP. It is assumed that the V2X of LTE or NR will be studied not limited to in the 3GPP specification in the future. For example, it is assumed that ensuring interoperability, reducing costs by implementing the higher layer, combining or switching multiple RATS (Radio Access Technology), supporting regulations in each country, and acquiring and distributing data and managing and using databases on the LTE or NR V2X platform.

In an embodiment of the present invention, the embodiment of the present invention is not limited to those in which the communication device is mainly intended to be mounted on a vehicle. For example, the communication device may be a human-held terminal, the communication device may be a device mounted on a drone or an aircraft, or the communication device may be a base station, an RSU, a relay node, or the like.

The SL (Sidelink) may be distinguished from UL (Uplink) or DL (Downlink) based on one of the following 1)-4) or a combination thereof. The SL may be also another name.
1) Resource allocation in time domain
2) Resource allocation in frequency domain
3) Synchronization signal to be referenced (including SLSS (Sidelink Synchronization Signal))
4) Reference signal used for path loss measurement for transmission power control In the SL of LTE, Mode3 and Mode4 are specified for assigning SL resources to the user device 20. In Mode3, a transmission resource is dynamically assigned by a DCI (Downlink Control Information) transmitted from the base station device 10 to the user device 20. In Mode3, SPS (Semi Persistent Scheduling) is also available. In Mode4, the user device 20 selects the transmission resource autonomously from a resource pool.

Here, in the eV2X use case, for example, URLLC traffic with an end-to-end acceptable delay of 3 ms is assumed. In other use cases of eV2X, for example, it is assumed that eMBB traffic with an end-to-end acceptable delay of 100 ms and a high data rate being required. Therefore, there is a scenario in which URLLC and eMBB traffics are multiplexed in the SL of NR.

Figure 2:
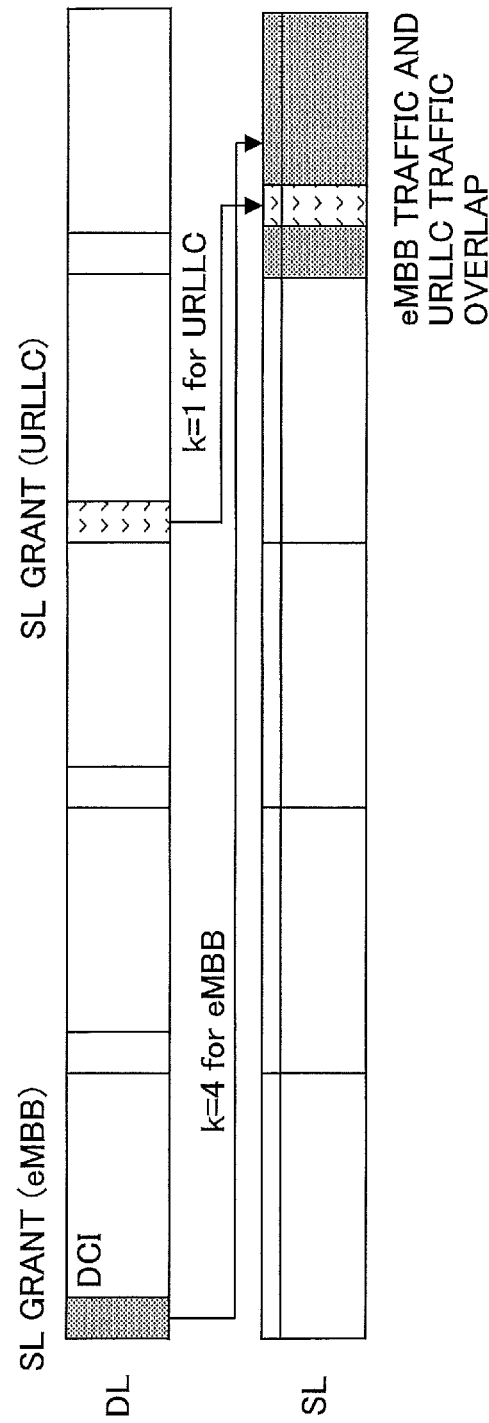
FIG. 2 is a diagram illustrating an example (1) of scheduling.

FIG. 2 is a diagram for explaining an example (1) of scheduling in an embodiment of the present invention. As shown in FIG. 2, for SL transmission, the user device 20 receives at slot n-k an SL grant of data to be transmitted at slot n through a DCI (Downlink Control Information) from the base station device 10 or a user device 20 having scheduling capability. The SL grant may include at least one of: time/frequency resource location used for transmission; MCS (Modulation and Coding Scheme); TBS (Transport block size); RI (Rank Indicator); a reference signal used for path loss calculation; information on transmission power; and other information required for the SL transmission. The letter k is a non-negative integer and k applied to URLLC traffic is usually less than k applied to eMBB traffic. In the example shown in FIG. 2, k applied to URLLC traffic is 1 and k applied to eMBB traffic is 4. In addition, the number of slots that the SL is scheduled after the SL grant by the DCI (after 4 slots in FIG. 2) may be configured with RRC (Radio Resource Control) signaling, for example, or may be configured with a value calculated in the user device 20 based on the DCI, numerology of a shared data channel (e.g., PDSCH (Physical Downlink Shared Channel), PUSCH (Physical Uplink Shared Channel) or the like) or BWP (Bandwidth part). The numerology refers, for example, to a communication parameter (e.g., a configuration value that defines a sub-carrier interval or the like) that is applied to the transmission and reception of a signal.

Because URLLC traffic is transmitted to the extent that packet delay is acceptable, the URLLC traffic may be scheduled in the SL with overlapping eMBB traffic, as shown in FIG. 2.

The user device 20 with scheduling capability is a user device 20 that determines and indicates at least one of a MCS, a TBS, a rank or a transmission layer number, a resource allocation, a transmission power, and a transmission timing based on an instruction from the base station device 10 or autonomously to another user device 20.

Figure 3:
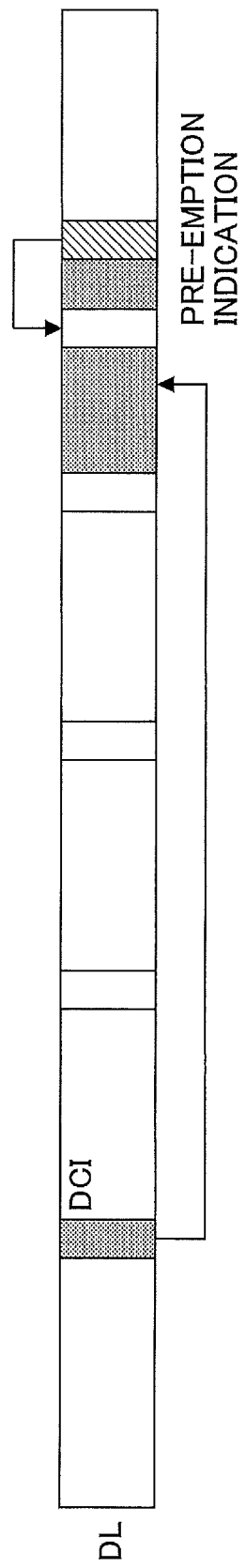
FIG. 3 is a diagram illustrating an example (2) of scheduling.

FIG. 3 is a diagram illustrating an example (2) of scheduling in an embodiment of the present invention. In the DL of NR, pre-emption of the eMBB transmission resource is implicitly performed by the base station device 10. A pre-emption indication to the eMBB traffic transmission is transmitted to notify the receiving user device 20 of the pre-emption and assists in decoding in the receiving user device 20. In the example shown in FIG. 3, for the eMBB traffic scheduled by DCI, "pre-emption indication" is performed afterward in the time domain via DCI.

Figure 4:
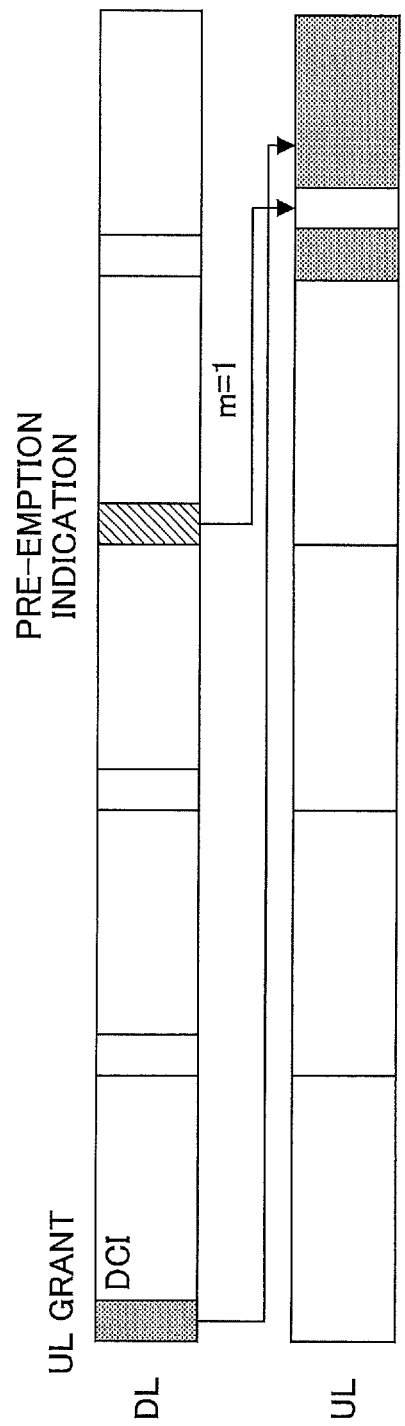
FIG. 4 is a diagram illustrating an example (3) of scheduling.

FIG. 4 is a diagram illustrating an example (3) of scheduling in an embodiment of the present invention. In the UL of NR, the methods 1) and 2) below are considered as the pre-emption of eMBB transmission resource.

1) eMBB Transmission Pre-Emption Between Different UEs (Inter-UE eMBB Pre-Emption)

In this case, URLLC and eMBB traffics are transmitted from different user devices 20. The base station device 10 transmits a "pre-emption indication" to notify the transmitting user device 20 that the eMBB transmission is pre-empted. A user device 20 different from the user device 20 that transmits the eMBB traffic can transmit URLLC traffic using the pre-empted resource.

2) Intra-UE eMBB Pre-Emption

In this case, URLLC and eMBB traffics are transmitted from the same user device 20. The operation is predefined when the user device 20 is instructed to perform pre-emption on the resource scheduled for eMBB transmission.

In the example shown in FIG. 4, performing pre-emption for eMBB traffic is indicated by the pre-emption indication earlier, by one slot, than the eMBB traffic scheduled by the UL grant.

In the SL, pre-emption for eMBB transmission such as 1) 2) below may be supported.

1) Preempting SL Resource of eMBB Transmission Between Different UEs

In this case, URLLC and eMBB traffics are transmitted from different user devices 20. The base station device 10 transmits a "pre-emption indication" of the SL resource to notify the transmitting user device 20 which is performing the eMBB transmission that the eMBB transmission is pre-empted. In addition, the user device 20 receiving the eMBB may be notified of the "pre-emption indication". The operation of the transmitting user device 20 and the operation of the receiving user device 20 can corporate with each other.

2) Preempting SL Resource of eMBB Transmission in the UE

In this case, URLLC and eMBB traffics are transmitted from the same user device 20. The operation of the user device 20 is predefined when the user device 20 is instructed to perform pre-emption on a SL resource to which eMBB and URLLC traffics are multiplexed and scheduled. In addition, the user device 20 receiving the eMBB may be notified of the "pre-emption indication." The operation of the transmitting user device 20 and the operation of the receiving user device 20 can corporate with each other.

Hereinafter, the pre-empting of a SL resource of eMBB transmission between different UEs will be described. Traffic of the pre-empted resource is not limited to eMBB but may be traffics of other types, and the traffics may be distinguished by logical channel ID, PPPP (ProSe per packet priority), QCI (QoS Class Identifier) or the like. Similar methods are also applicable when traffics conflict between SL and UL.

For the user device 20 scheduled with transmission via a SL resource, pre-empting of all or part of the SL resource via which the transmission is scheduled is supported by introducing pre-emption indication signaling. The location of the resource to be pre-empted is indicated by the pre-emption indication. The pre-emption indication may be transmitted by the base station device 10, transmitted by a user device 20 with scheduling capability, or transmitted by a user device 20 that performs the transmission of URLLC traffic using the pre-empted resource or a user device 20 proximate thereto (a near user device 20, a near UE 20). The proximate user device 20 (near UE 20) may be configured by the base station device 10 or the user device 20 with scheduling capability. The proximate user device 20 may be configured with PHY layer signaling, such as, for example, DCI or SCI (Sidelink control information), or may be configured with higher layer signaling, such as RRC signaling, or predefined by the specification. Alternatively, the proximate user device 20 may be configured in accordance with a value calculated in the user device 20 based on DCI, SCI, numerology of a shared data channel (e.g., PSSCH (Physical Sidelink Shared Channel) or the like), or BWP.

Figure 5:
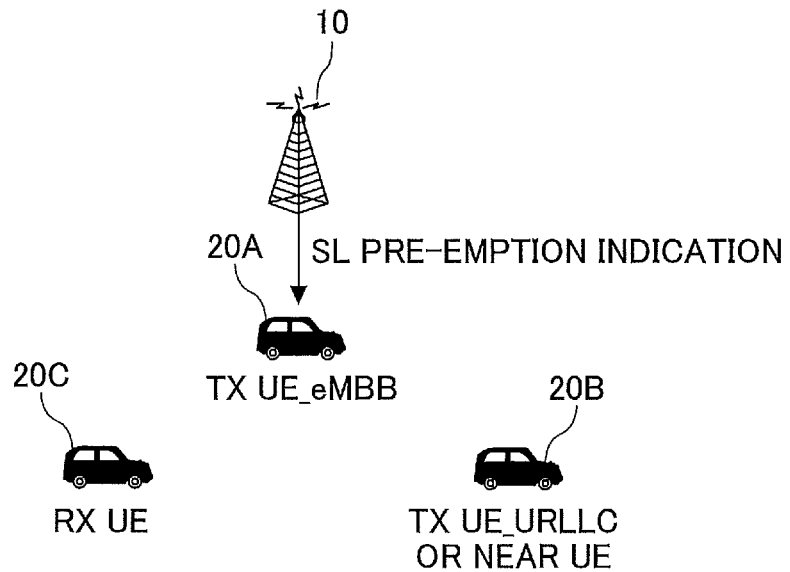
FIG. 5 is a diagram illustrating an example (1) of a notice in an embodiment of the present invention.

FIG. 5 is a diagram illustrating an example (1) of a notice according to an embodiment of the present invention. In FIG. 5, the base station device 10 schedules the SL. The user device 20A performs SL transmission of eMBB traffic. The user device 20B performs SL transmission of URLLC traffic. In addition, the user device 20B may be a user device 20 proximate to the user device 20 that transmits URLLC traffic. The user device 20C is a user device 20 that performs SL reception. The user device 20 that receives eMBB traffic and the user device 20 that receives URLLC traffic may be different user devices 20.

As shown in FIG. 5, the base station device 10 transmits the SL pre-emption indication to the user device 20A which transmits eMBB traffic. The base station device 10 may be replaced by a user device 20 with scheduling capability. That is, the user device 20 having scheduling capability may transmit the SL pre-emption indication to the user device 20A transmitting eMBB traffic. The user device 20A can exclude a pre-empted SL resource from the SL resource scheduled for eMBB by receiving the SL pre-emption indication.

Figure 6:
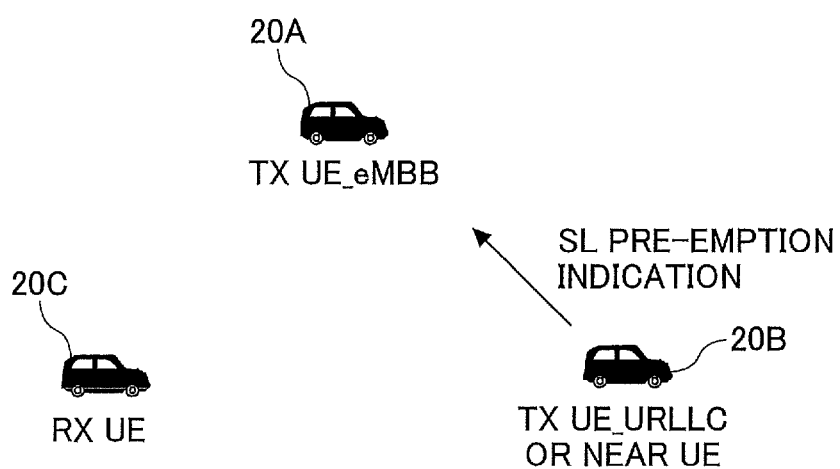
FIG. 6 is a diagram illustrating an example (2) of a notice in an embodiment of the present invention.

FIG. 6 is a diagram illustrating an example (2) of a notice according to an embodiment of the present invention. In FIG. 6, the user device 20A performs SL transmission of eMBB traffic. The user device 20B performs SL transmission of URLLC traffic. The user device 20B may be a user device 20 proximate to the user device 20 that transmits URLLC traffic. The user device 20C is a user device 20 that performs SL reception. The user device 20 that receives eMBB traffic and the user device 20 that receives URLLC traffic may be different user devices 20.

As shown in FIG. 6, the user device 20B transmits the SL pre-emption indication to the user device 20A that transmits eMBB traffic. The user device 20A can exclude a pre-empted SL resource from the SL resources scheduled for eMBB by receiving the SL pre-emption indication.

Layer 1 signaling is used for transmission of the pre-emption indication described in FIGS. 5 and 6. For example, the base station device 10 may transmit a pre-emption indication in a DCI via PDCCH (Physical Downlink Control Channel), or the user device 20 may transmit a pre-emption notification in a SCI via PSCCH (Physical Sidelink Control Channel).

The pre-emption indication to SL data in slot n may be transmitted in slot n-m symbol x or in slot n-m. The letter m or x is a non-negative integer. The m or x may be determined or configured based on the processing capacity of the user device 20 reported to the base station device 10, or may be predefined in the technical specification.

UE common signaling, cell-specific signaling or UE-specific signaling may be used for the pre-emption indication. For example, it may be signaling via PBCH (Physical Broadcast Channel) or PSBCH (Physical Sidelink Broadcast Channel). It may also be, for example, a UE-common RNTI (Radio Network Temporary Identifier), signaling via PDCCH or PSCCH masked with a UE-common RNTI or a UE-specific RNTI.

When the scheduled SL resource is partially pre-empted, the user device 20 may be configured or predefined to perform rate matching or puncturing on the remaining SL resource. In addition, rescheduling information may be included in the pre-emption indication signaling to compensate for the pre-empted resource. The rescheduling information may include, for example, resource allocation, MCS, TBS, and RI (Rank Indicator). When the rescheduling information was included in the pre-emption indication signaling, the user device 20 transmits all or part of the data originally scheduled for the pre-empted resource using the rescheduled resource.

Figure 7:
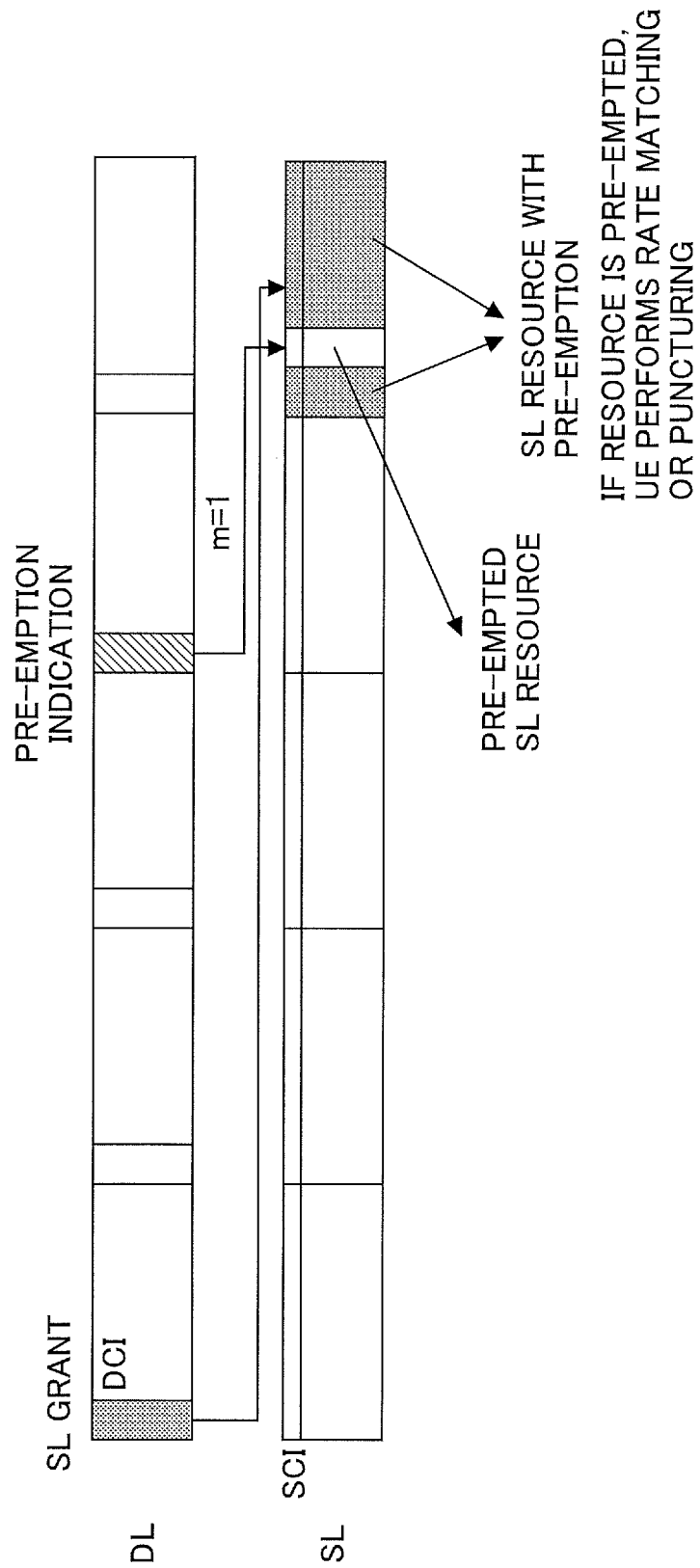
FIG. 7 is a diagram illustrating an example (1) of scheduling in an embodiment of the present invention.

FIG. 7 is a diagram illustrating an example (4) of scheduling in an embodiment of the present invention. FIG. 7 shows an example where the base station device 10 transmits a SL grant and a pre-emption indication. As shown in FIG. 7, the SL is scheduled later, by the four slots, than the transmission of the SL grant in the DCI. Since m=1, the pre-emption indication in DCI is transmitted earlier, by one slot, than the slot the SL has been scheduled. By the pre-emption indication, the user device 20 can identify a pre-empted SL resource and a SL resource with pre-emption. Hereinafter, the remaining resource when the scheduled SL resource is partially pre-empted is referred to as "SL resource with pre-emption." In the SL resource with pre-emption, the user device 20 may perform rate matching or puncturing.

The multiplexing of PSCCH and PSSCH is not limited to the illustrated frequency division multiplexing (FDM). The multiplexing of PSCCH and PSSCH may be time division multiplexing (TDM). The allocation in the frequency region of the PSCCH is not limited to the upper end of the illustrated SL frequency, may be at the lower end of the SL frequency, or may be another allocation.

Figure 8:
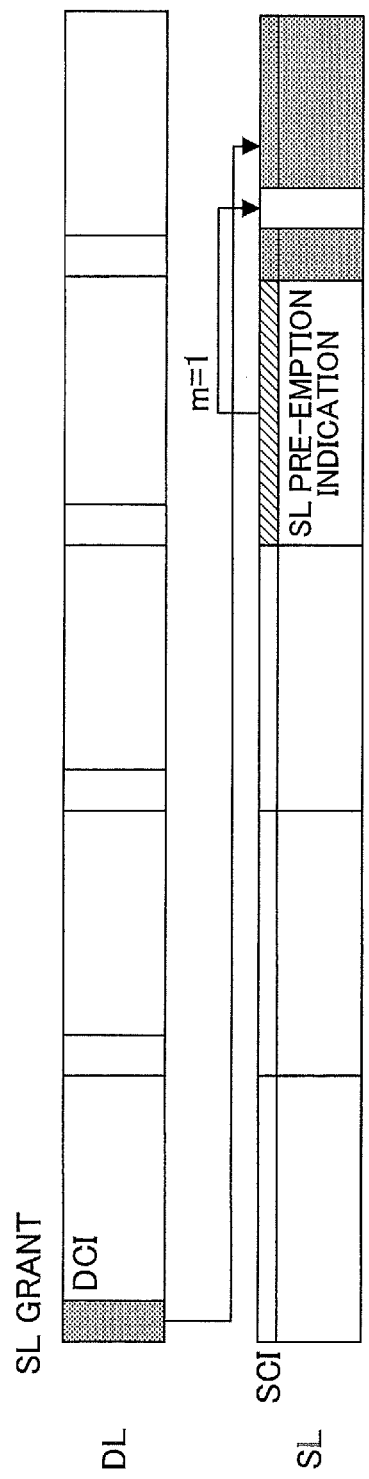
FIG. 8 is a diagram illustrating an example (2) of scheduling in an embodiment of the present invention.

FIG. 8 is a diagram illustrating an example (5) of scheduling in an embodiment of the present invention. FIG. 8 is an example in which the base station device 10 transmits an SL grant and the user device 20 transmits a pre-emption indication based on an instruction from the base station device 10. As shown in FIG. 8, the SL is scheduled later, by four slots, than the transmission of the SL grant in DCI. Since m=1, the pre-emption indication is transmitted in the SCI earlier, by one slot, than the slot in which the SL was scheduled. By the pre-emption indication, the user device 20 can identify a pre-empted SL resource and a SL resource with pre-emption.

Figure 9:
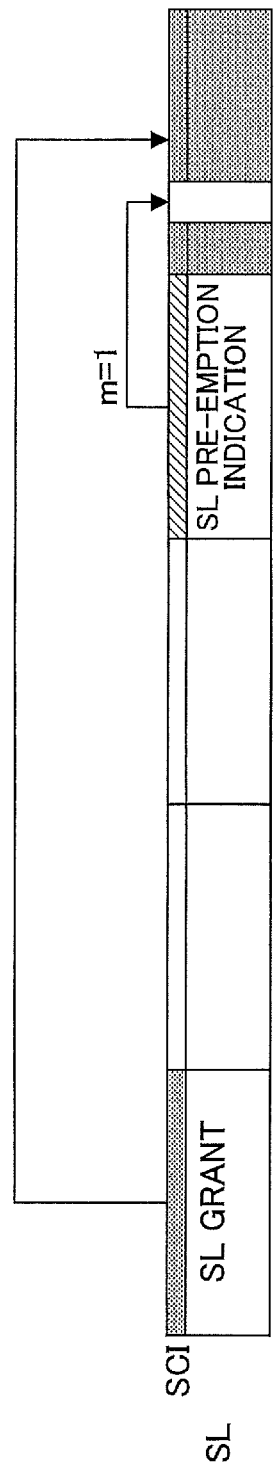
FIG. 9 is a diagram illustrating an example (3) of scheduling in an embodiment of the present invention.

FIG. 9 is a diagram illustrating an example (6) of scheduling in an embodiment of the present invention. FIG. 9 is an example of a user device 20 with scheduling capability transmitting an SL grant and transmitting a pre-emption indication. As shown in FIG. 9, the SL is scheduled later, by the four slots, than the transmission of the SL grant in the SCI. Since m=1, the pre-emption indication is transmitted in the SCI earlier, by one slot, than the slot in which the SL was scheduled. By the pre-emption indication, the user device 20 can identify a pre-empted SL resource and a SL resource with pre-emption.

Figure 10:
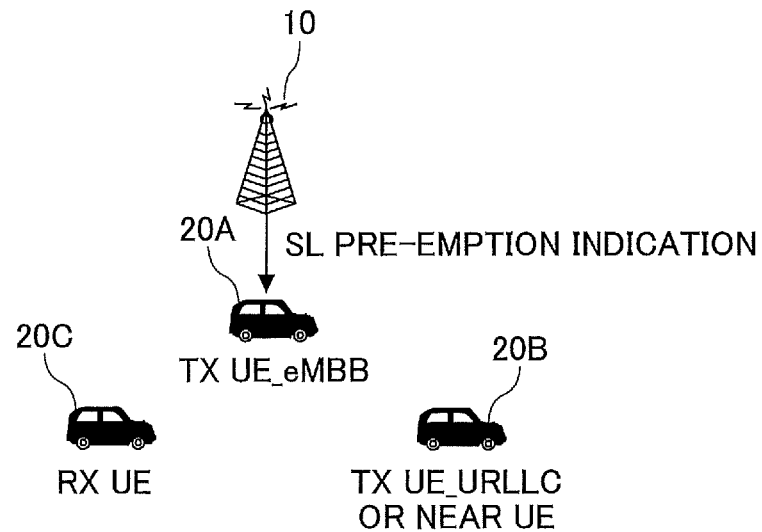
FIG. 10 is a diagram illustrating an example (1) of a sequence according to an embodiment of the present invention.

FIG. 10 is for explaining an example (1) of a sequence according to an embodiment of the present invention. FIG. 10 is an example of a sequence corresponding to the scheduling of FIG. 7. In FIG. 10, the base station device 10 schedules the SL. The user device 20A performs SL transmission of eMBB traffic. The user device 20B performs SL transmission of URLLC traffic. In addition, the user device 20B may be a user device 20 proximate to the user device 20 that transmits URLLC traffic. The user device 20C is a user device 20 that performs SL reception. The user device 20 that receives eMBB traffic and the user device 20 that receives URLLC traffic may be different user devices 20.

As shown in FIG. 10, the base station device 10 transmits the SL pre-emption indication to the user device 20A that transmits eMBB traffic. The user device 20A can exclude a pre-empted SL resource from the SL resource scheduled for eMBB by receiving the SL pre-emption indication.

Figure 11:
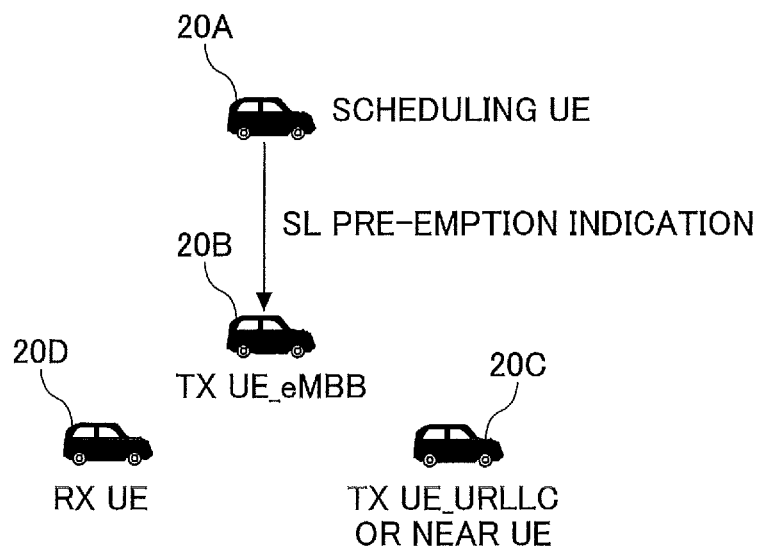
FIG. 11 is a diagram illustrating an example (2) of a sequence according to an embodiment of the present invention.

FIG. 11 is for explaining an example (2) of a sequence according to an embodiment of the present invention. FIG. 11 is an example of a sequence corresponding to the scheduling of FIG. 9. In FIG. 11, the user device 20 with scheduling capability schedules the SL. The user device 20A performs SL transmission of eMBB traffic. The user device 20B transmits SL URLLC traffic. In addition, the user device 20B may be a user device 20 proximate to the user device 20 that transmits URLLC traffic. A user device 20C is a user device 20 that performs SL reception. The user device 20 that receives eMBB traffic and the user device 20 that receives URLLC traffic may be different user devices 20.

As shown in FIG. 11, the user device 20 with scheduling capability transmits the SL pre-emption indication to the user device 20A that transmits eMBB traffic. The user device 20A can exclude a pre-empted SL resource from the SL resource scheduled for eMBB by receiving the SL pre-emption indication.

Figure 12:
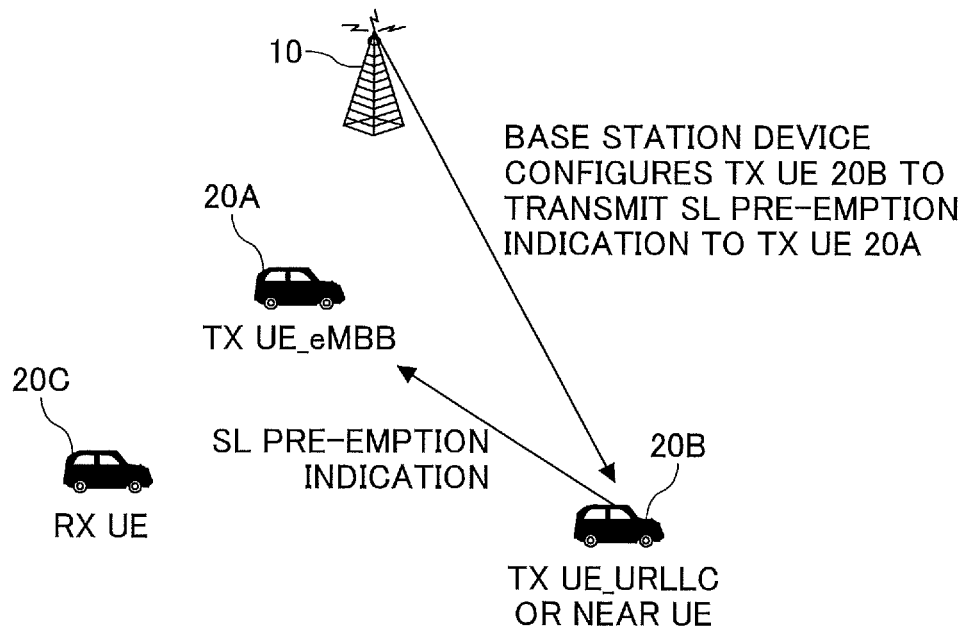
FIG. 12 is a diagram illustrating an example (3) of a sequence according to an embodiment of the present invention.

FIG. 12 is a diagram illustrating an example (3) of a sequence according to an embodiment of the present invention. FIG. 12 is an example of a sequence corresponding to the scheduling of FIG. 8. In FIG. 12, the base station device 10 schedules the SL. The user device 20A performs SL transmission of eMBB traffic. The User device 20B performs SL transmission of URLLC traffic. In addition, the user device 20B may be a user device 20 proximate to the user device 20 that transmits URLLC traffic. The user device 20C is a user device 20 that performs SL reception. The user device 20 that receives eMBB traffic and the user device 20 that receives URLLC traffic may be different user devices 20.

As shown in FIG. 12, the base station device 10 configures the user device 20B to transmit a SL pre-emption indication to the user device 20A. Upon receipt of this configuration, the user device 20B transmits the SL pre-emption indication to the user device 20A that transmits eMBB traffic. The user device 20A can exclude a pre-empted SL resource from the SL resource scheduled for eMBB by receiving the SL pre-emption indication.

Figure 13:
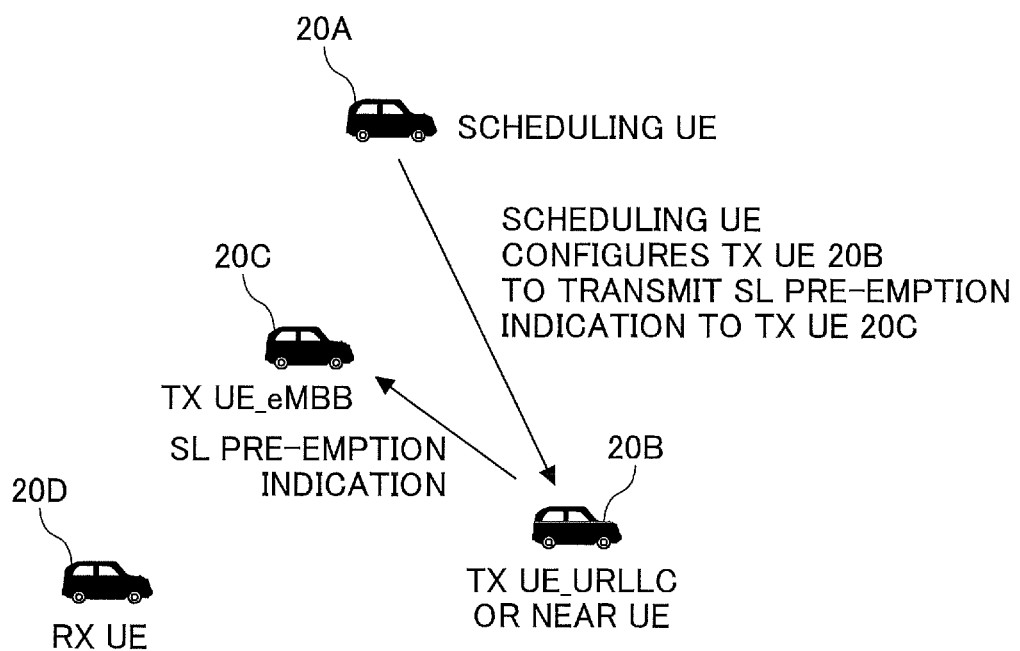
FIG. 13 is a diagram illustrating an example (4) of a sequence according to an embodiment of the present invention.

FIG. 13 is a diagram illustrating an example (4) of a sequence according to an embodiment of the present invention. FIG. 13 is an example of a sequence corresponding to the scheduling of FIG. 9. In FIG. 13, the user device 20 with scheduling capability schedules the SL. The user device 20A performs SL transmission of eMBB traffic. The user device 20B performs SL transmission of URLLC traffic. In addition, the user device 20B may be a user device 20 proximate to the user device 20 that transmits URLLC traffic. The user device 20C is a user device 20 that performs SL reception. The user device 20 that receives eMBB traffic and the user device 20 that receives URLLC traffic may be different user devices 20.

As shown in FIG. 13, the user device 20 with scheduling capability configures the user device 20B to transmit the SL pre-emption indication to the user device 20A. Upon receipt of this configuration, the user device 20B transmits the SL pre-emption indication to the user device 20A that transmits eMBB traffic. The user device 20A can exclude a pre-empted SL resource from the SL resource scheduled for eMBB by receiving the SL pre-emption indication.

Figure 14:
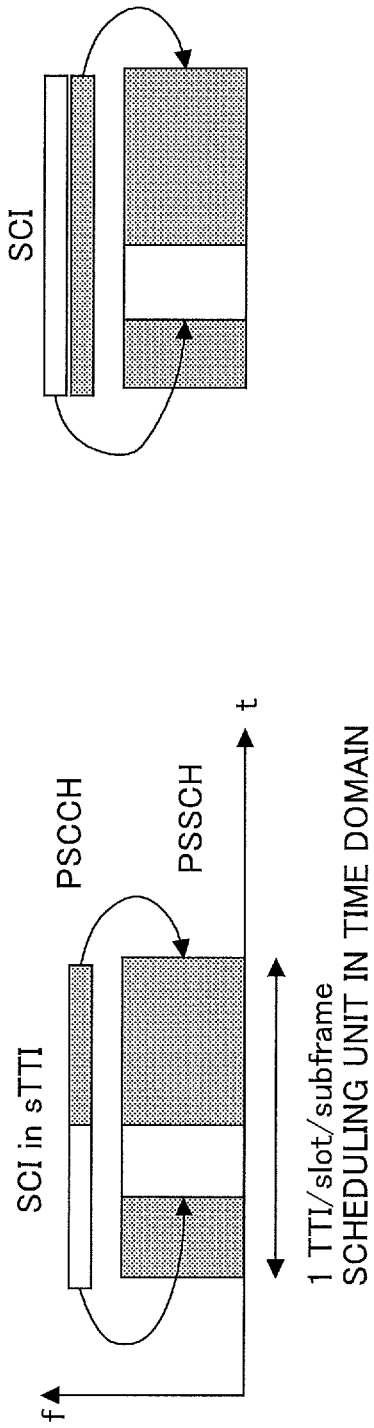
FIG. 14 is a diagram illustrating an example (1) of a SCI in an embodiment of the present invention.

FIG. 14 is a diagram illustrating an example (1) of an SCI according to an embodiment of the present invention. In the operation of the transmitting user device 20, the transmission (e.g., URLLC traffic) in a pre-empted resource may be indicated in a SCI different from the transmission (e.g., eMBB traffic) in a resource with pre-emption. Notification of traffic type may be included in the DCI or SCI.

As shown in the left diagram of FIG. 14, sTTI (short Transmission Time Interval) in PSCCH may be used to indicate multiplexed traffic. As shown in the right diagram of FIG. 14, each traffic may be indicated in a different SCI. Whether or not to use rate matching or puncturing in a resource with pre-emption may be indicated by the SCI associated with data transmission in the resource with pre-emption. It is noted that the PSCCH indicating the pre-emption or PSSCH scheduling may be disposed on a TTI or the like that differs from the associated PSSCH transmission.

Figure 15:
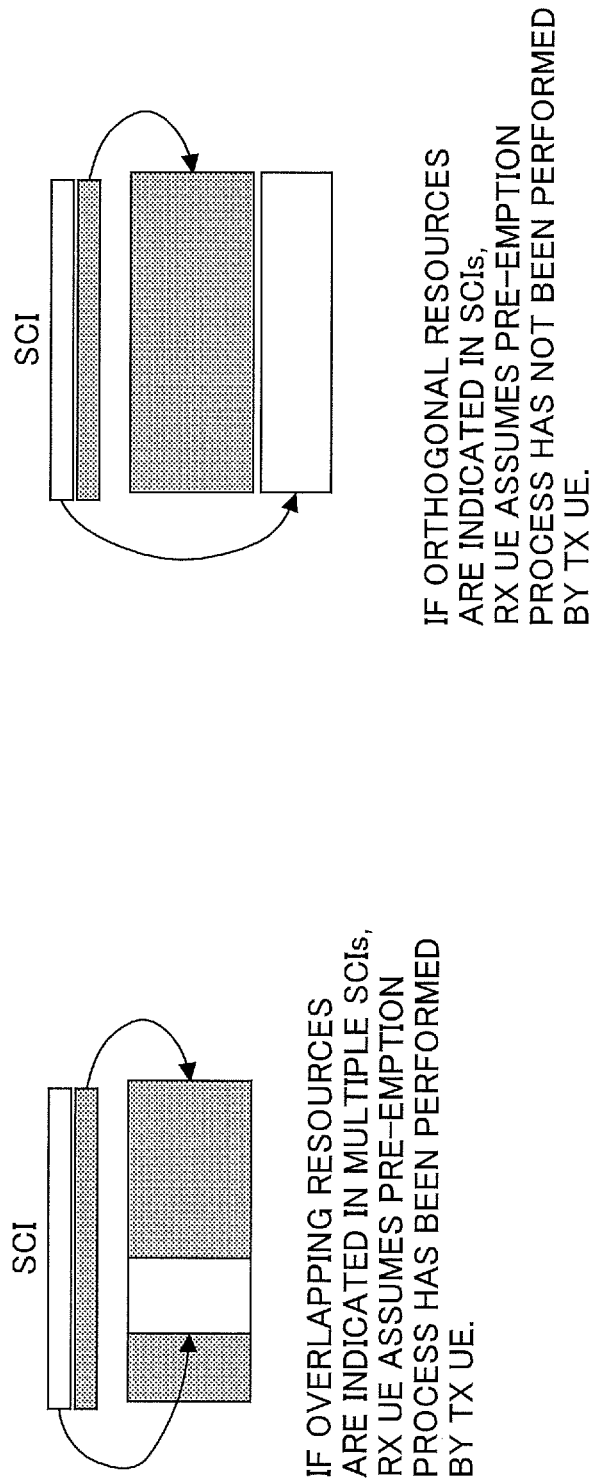
FIG. 15 is a diagram illustrating an example (2) of a SCI according to an embodiment of the present invention.

FIG. 15 is a diagram illustrating an example (2) of an SCI according to an embodiment of the present invention. As shown in FIG. 15, when the receiving user device 20 detects SCIs indicating overlapping resources as an operation of the receiving user device 20, the user device 20 may assume that the resource is pre-empted. The operation allows the receiving user device 20 to know the pre-emption process of resource by the transmitting user device 20. The user device 20 can recognize prioritized traffic based on notification of traffic type or timing of SL grant. For example, among the two SL grants, slow-timing SL grant may be prioritized or traffic may be recognized based on the size, location, or TBS of the resources obtained from the decoded SCI. On the other hand, as shown in FIG. 15, when SCIs for indicating orthogonal resources are detected, it may be assumed that the pre-emption process has not been performed by the transmitting user device 20.

In addition, the receiving user device 20 may derive that resource pre-emption is being performed from the SL pre-emption indication. The receiving user device 20 may be predefined as to whether it is configured to follow any one piece of information pertaining to pre-emption when multiple pieces of the pre-emption information is derived based on the notice by the SCI or the SL pre-emption indication.

Hereinafter, the pre-emption of eMBB-transmitting SL resource in the UE will be described. It is noted that traffic of the pre-empted resource is not limited to eMBB, and may be of other types, and traffic may be distinguished by logical channel ID, PPPP, QCI, or the like. Similar methods are also applicable when traffic conflicts between SL and UL.

Figure 16:
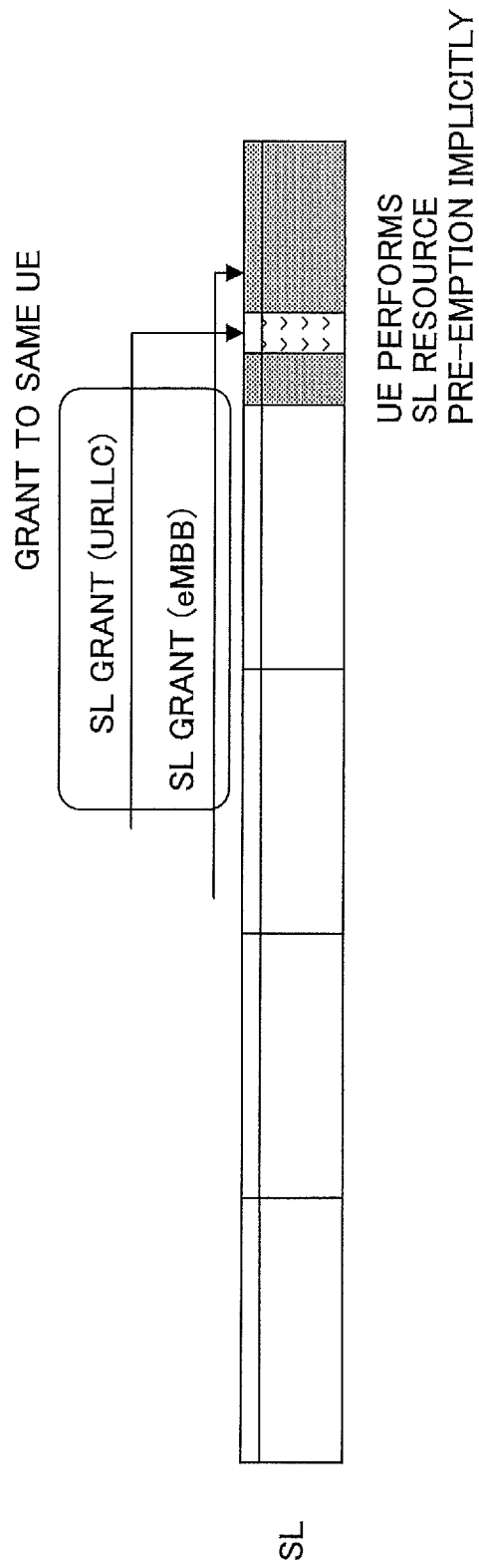
FIG. 16 is a diagram illustrating an example (4) of scheduling in an embodiment of the present invention.

FIG. 16 is a diagram illustrating an example (7) of scheduling in an embodiment of the present invention. As shown in FIG. 16, the transmitting user device 20 may performs SL resource pre-emption when multiple packet transmissions (e.g., URLLC transmission and eMBB transmission) are scheduled by SL grants in overlapping resources. That is, the user device 20 may implicitly perform SL resource pre-emption in overlapping resources.

When a subset of a scheduled resource is rescheduled or prioritized with respect to the other packet transmission, the user device 20 may perform pre-emption on a subset of the scheduled resource. In the resource with pre-emption, whether or not to use rate matching or puncturing may be configured or predefined.

Figure 17:
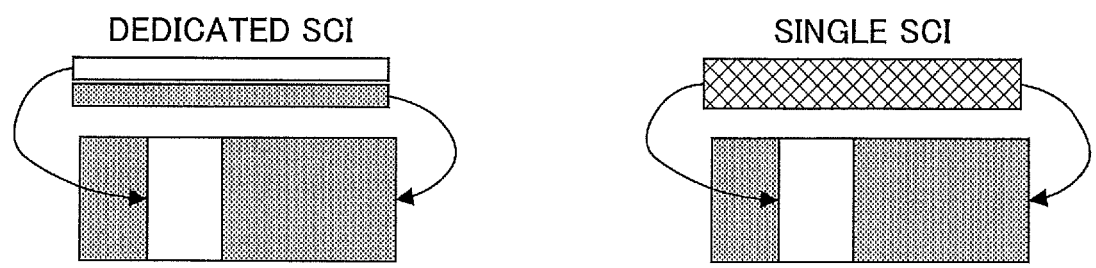
FIG. 17 is a diagram illustrating an example (3) of a SCI in an embodiment of the present invention.

FIG. 17 is a diagram illustrating an example (3) of an SCI according to an embodiment of the present invention. As an operation of the transmitting user device 20, when performing data transmission of multiple packets, the associated SCI may indicate the transmission of each packet. Here, as shown in FIG. 17, the base station device 10 or the user device 20 with scheduling capability may be configured or predefined to schedule a dedicated SCI via PSCCH for SCI transmission corresponding to each packet transmission. That is, the 1SCI corresponds to one transmission packet.

On the other hand, as shown in FIG. 17, it may be configured or predefined that a single SCI has multiple resource allocation notification fields and it is indicated that multiple packets are included in multiplexed resources.

In the operation of the receiver user device 20, if the receiving user device 20 detects a SCI indicating the overlapped resources, the receiver user device 20 may pre-empt the resource. That is, it may be similar to the operation of the receiving user device 20 in the eMBB transmission pre-emption between the different UEs described above.

With the above described example, by performing the SL resource pre-emption process and indication, even when eMBB and URLLC traffics in a single SL transmit resource are multiplexed, no transmission collision occurs and the URLLC traffic can be transmitted preferentially.

In other words, in inter-terminal communication, information pertaining to scheduling according to the traffic type can be indicated.

(Device Configurations)

Next, a functional configuration example of the base station device 10 and the user device 20 that executes the process and operation described above will be described. The base station device 10 and user device 20 include the functions of implementing the embodiments described above. However, each of the base station device 10 and the user device 20 may include only some of the functions in the example.

<Base Station Device 10>

Figure 18:
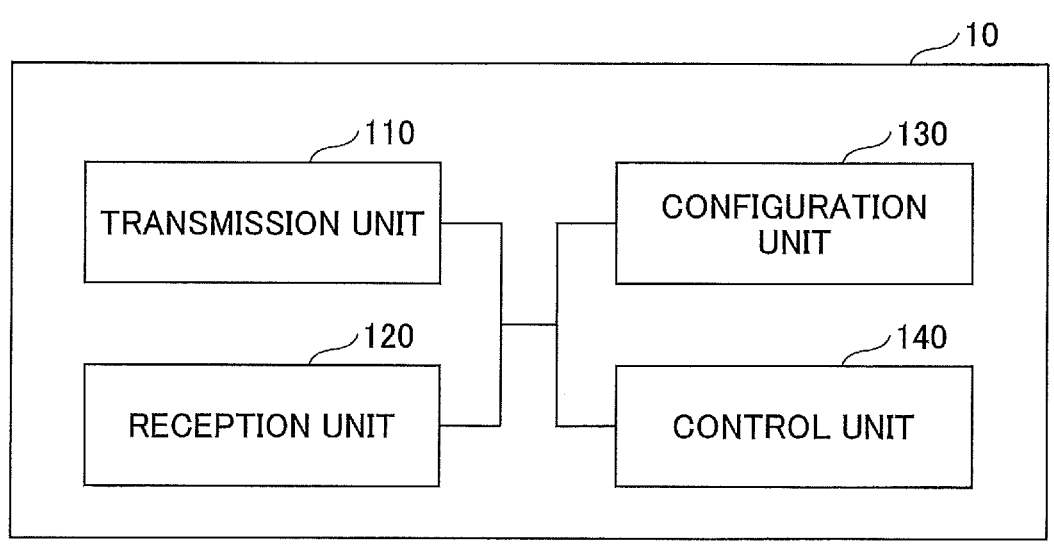
FIG. 18 is a diagram illustrating an example of a functional configuration of a base station device according to an embodiment of the present invention.

FIG. 18 is a diagram illustrating an example of a functional configuration of the base station device 10. As shown in FIG. 18, the base station device 10 includes a transmission unit 110, a reception unit 120, a configuration unit 130, and a control unit 140. The functional configuration shown in FIG. 18 is merely one example. As long as the operations according to an embodiment of the present invention can be executed, the function division and the name of the functional unit may be anything.

The transmission unit 110 includes a function of generating a signal to be transmitted to a side of the user device 20 and transmitting the signal wirelessly. The reception unit 120 includes a function for receiving various signals transmitted from the user device 20 and acquiring, for example, information of a higher layer from the received signal. The transmission unit 110 has a function of transmitting NR-PSS, NR-SSS, NR-PBCH, DL/UL control signals, and the like to the user device 20. In addition, for example, the transmission unit 110 transmits information indicating that another terminal is proximate to the user device 20, and the reception unit 120 receives terminal information from the user device 20.

The configuration unit 130 stores pre-configured configuration information and various configuration information transmitted to the user device 20 in the storage unit and reads out the configuration information from the storage unit as needed. The content of the configuration information is, for example, information pertaining to scheduling of D2D communication, or the like.

As described in the example, the control unit 140 executes a process pertaining to configuration in which the user device 20 performs D2D communication. The control unit 140 executes a process pertaining to scheduling of the D2D communication. A function unit for transmitting signals in the control unit 140 may be included in the transmission unit 110, and a function unit for receiving signals in the control unit 140 may be included in the reception unit 120.

<User device 20>

Figure 19:
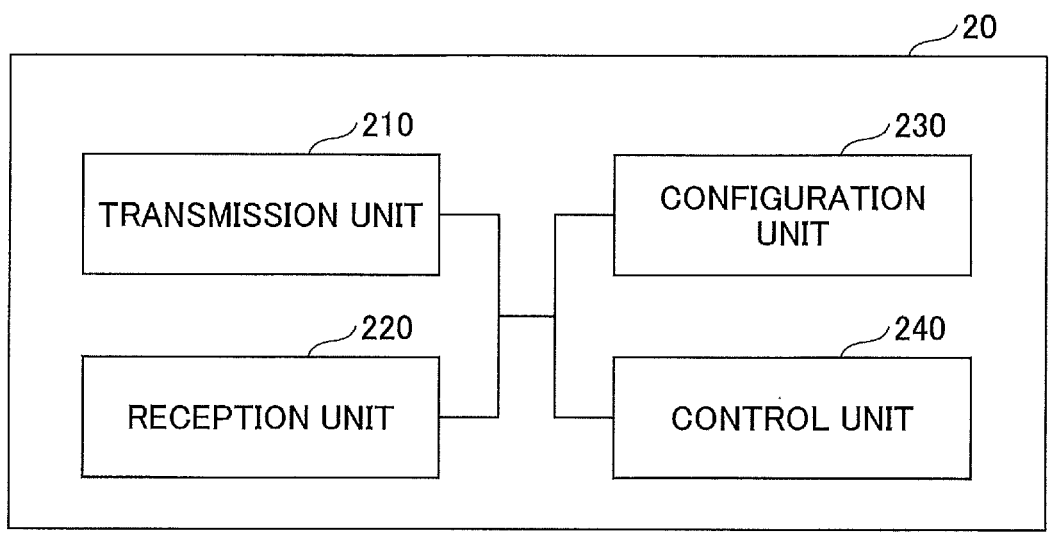
FIG. 19 is a diagram illustrating an example of a functional configuration of a user device 20 according to an embodiment of the present invention.

FIG. 19 is a diagram illustrating an example of a functional configuration of a user device 20. As shown in FIG. 19, the user device 20 includes a transmission unit 210, a reception unit 220, a configuration unit 230, and a control unit 240. The functional configuration shown in FIG. 19 is merely one example. As long as the operations according to an embodiment of the present invention can be executed, the function division and the name of the functional unit may be anything.

The transmission unit 210 generates a transmission signal from transmission data and transmits the transmission signal wirelessly. The reception unit 220 receives a variety of signals wirelessly and acquires a higher layer signal from the received physical layer signal. In addition, the reception unit 220 has a function of receiving NR-PSS, NR-SS, NR-PBCH, DL/UL/SL control signals, and the like transmitted from the base station device 10. In addition, for example, the transmission unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to another user device 20 as D2D communication, and the reception unit 120 receives PSCCH, PSSCH, PSDCH, PSBCH and the like from another user device 20.

The configuration unit 230 stores various configuration information received by the reception unit 220 from the base station device 10 or the user device in the storage unit, and reads out the configuration information from the storage unit as needed. In addition, the configuration unit 230 also stores pre-configured configuration information. The content of the configuration information is, for example, information pertaining to scheduling of D2D communication or the like.

As described in the example, the control unit 240 controls D2D communication performed with another user device 20. The control unit 240 executes a process pertaining to scheduling of D2D communication. A function unit for transmitting signals in the control unit 240 may be included in the transmission unit 210, and a function unit for receiving signals in the control unit 240 may be included in the reception unit 220.

<Hardware Configuration>

The configuration diagrams used in the description of the embodiments of the present invention (FIGS. 18 and 19) illustrate blocks in the units of functions. These functional blocks (constituent units) are embodied in a combination of hardware and/or software. In addition, means for embodying the functional blocks is not particularly limited. That is, each functional block may be embodied by one unit in which a plurality of elements are physically and/or logically coupled, or may be embodied by two or more units which are physically and/or logically separated and which are connected directly and/or indirectly (for example, in a wired and/or wireless manner).

Figure 20:
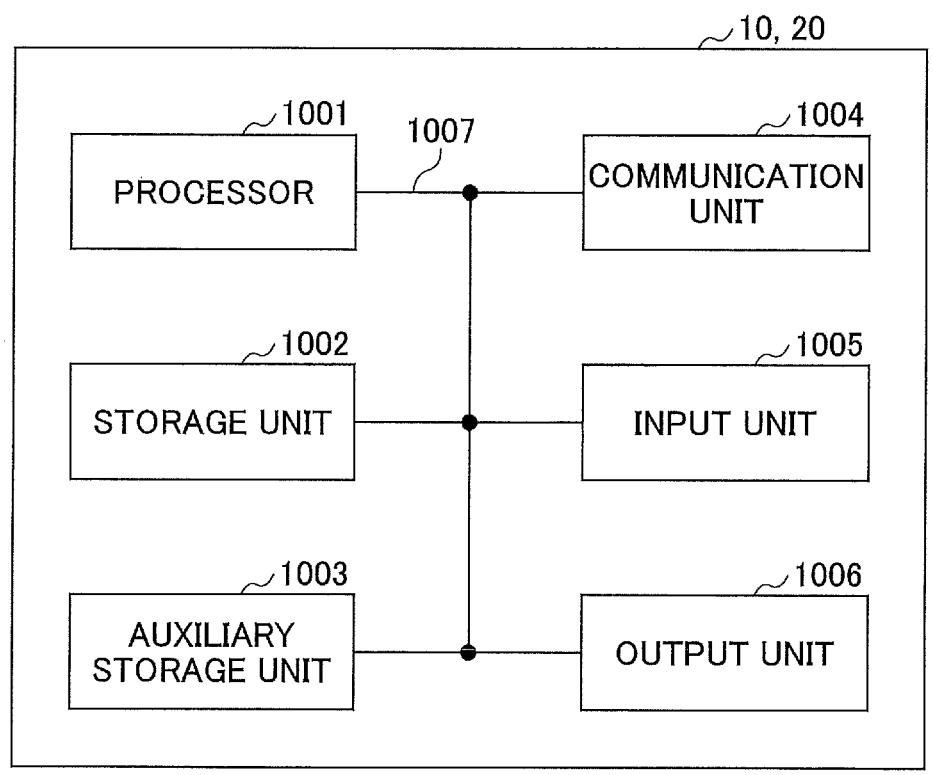
FIG. 20 is a diagram illustrating an example of a hardware configuration of a base station device 10 or a user device 20 in an embodiment of the present invention.

In addition, for example, both the base station device 10 and the user device 20 in an embodiment of the present invention may function as computers that perform the processes according to the embodiment of the present invention. FIG. 20 is a diagram illustrating an example of hardware configuration of the base station device 10 or the user device 20 according to the embodiment of the present invention. The base station device 10 and the user device 20 described above may each be physically configured as a computer device including a processor 1001, a storage unit 1002, an auxiliary storage unit 1003, a communication unit 1004, an input unit 1005, an output unit 1006, and a bus 1007, and the like.

It is noted that in the following description, a word "unit" may be referred to as a circuit, a device, a unit, or the like. The hardware configurations of the base station device 10 and the user device 20 may include one or more of units illustrated with 1001 to 1006 shown in the drawing or may not include some units.

The functions of the base station device 10 and the user device 20 are realized by causing hardware such as the processor 1001 and the storage unit 1002 to read predetermined software (a program) and causing the processor 1001 to perform computation and to control communication of the communication unit 1004 and reading and/or writing of data in the storage unit 1002 and the auxiliary storage unit 1003.

The processor 1001 controls the computer as a whole, for example, by operating an operating system. The processor 1001 may be constituted by a central processing unit (CPU) including an interface with peripherals, a control unit, a calculation unit, a register, and the like.

In addition, the processor 1001 reads a program (program codes), a software module, or data from the auxiliary storage unit 1003 and/or the communication unit 1004 to the storage unit 1002 and performs various processes in accordance therewith. As the program, a program causing a computer to perform at least a part of the operations described above in the embodiment is used. For example, the transmission unit 110, the reception unit 120, the configuration unit 130, and the control unit 140 of the base station device 10 shown in FIG. 18 may be embodied by a control program which is stored in the storage unit 1002 and operated by the processor 1001. In addition, for example, the transmission unit 210, the reception unit 220, the configuration unit 230, and the control unit 240 of the user device 20 shown in FIG. 19 may be embodied by a control program which is stored in the storage unit 1002 and operated by the processor 1001. Various processes described above have been described to be performed by a single processor 1001, but may be simultaneously or sequentially performed by two or more processors 1001. The processor 1001 may be mounted as one or more chips. It is noted that the program may be transmitted from a network via an electric communication line.

The storage unit 1002 is a computer-readable recording medium and may be constituted, for example, by at least one of a read only memory (ROM), an erasable programmable ROM (EPROM), an electrically erasable programmable ROM (EEPROM), a random access memory (RAM), and the like. The storage unit 1002 may be referred to as a register, a cache, or a main memory (a main storage unit). The storage unit 1002 can store a program (program codes), a software module, or the like which can be used to perform the processes according to an embodiment of the present invention.

The auxiliary storage unit 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, a magnetic strip, and the like. The auxiliary storage unit 1003 may be referred to as an auxiliary storage unit. The recording medium described above may be for example a database including the storage unit 1002 and/or the auxiliary storage unit 1003, a server, and another appropriate medium.

The communication unit 1004 is hardware (a transceiver device) that allows communication between computers via a wired and/or wireless network and is referred to as, for example, a network device, a network controller, a network card, a communication module, or the like. For example, the transmission unit 110 and the reception unit 120 of the base station device 10 may be embodied by the communication unit 1004. In addition, the transmission unit 210 and the reception unit 220 of the user device 20 may be embodied by the communication unit 1004.

The input unit 1005 is an input device (such as a keyboard, a mouse, a microphone, a switch, a button, or a sensor) that receives an input from the outside. The output unit 1006 is an output device (such as a display, a speaker, or an LED lamp) that performs outputting to the outside. It is noted that the input unit 1005 and the output unit 1006 may be configured as a unified body (such as a touch panel).

In addition, the units such as the processor 1001 and the storage unit 1002 are connected to each other via the bus 1007 for communicating information. The bus 1007 may be constituted by a single bus or may be configured by different buses between the units.

In addition, the base station device 10 and the user device 20 may be respectively configured to include hardware such as a microprocessor, a digital signal processor (DSP), an application specific integrated circuit (ASIC), a programmable logic device (PLD), or a field programmable gate array (FPGA) or a part or all of the functional blocks may be embodied by the hardware. For example, the processor 1001 may be mounted as at least one such hardware module.

(Summary of Embodiment)

As described above, according to an embodiment of the present invention, it is provided a user device comprising: a transmission unit that transmits a first traffic to a second user device using a resource scheduled for sidelink by a base station device or a first user device, a reception unit that receives from the base station device or the first user device a sidelink pre-emption indication indicating that all or part of the resource scheduled for the sidelink is to be used for a second traffic, and a control unit that excludes a resource used for the second traffic from a resource of the sidelink used for transmitting the first traffic, based on the sidelink pre-emption indication. The above configuration allows URLLC traffic to be transmitted preferentially, even when eMBB and URLLC traffics on a single SL transmission resource is multiplexed by performing a SL resource pre-emption process and indication, without causing a transmission collision. In other words, in inter-terminal direct communication, information pertaining to scheduling according to the traffic type can be indicated.

The sidelink pre-emption indication may be received earlier, in a time domain by a predetermined number of slots, than the resource scheduled for the sidelink, via downlink or sidelink Layer 1 signaling. The configuration allows the user device 20 to receive the SL resource pre-emption indication before the resource used for eMBB.

The sidelink pre-emption indication may be one of a notification to a group of user devices, a cell-specific notification, or a user device-specific notification, and includes information indicating a traffic type. The configuration allows the transmitting user device 20 and the receiving user device 20 to know that the traffic type using the SL resource has been changed by transmitting the SL resource pre-emption indication to the plurality of user devices 20.

The first traffic may be transmitted based on rescheduling information for a resource where the resource used for the second traffic is excluded from the resource scheduled for the sidelink. The configuration allows continuing communication using the rescheduling information that conforms to the SL resource changed by the SL resource pre-emption indication.

The first traffic may be transmitted by applying rate matching or puncturing to a resource where the resource used for the second traffic is excluded from the resource scheduled for the sidelink. The configuration allows continuing communication by performing a transmission-side process that conforms to the SL resource changed by SL resource pre-emption indication.

Further, according to an embodiment of the present invention, it is provided a base station device comprising: a transmission unit that transmits to a user device a sidelink grant that schedules a resource of sidelink for transmitting a first traffic, and a control unit that transmits to the user device a sidelink pre-emption indication indicating all or part of the sidelink resource for transmitting the first traffic is used for a second traffic, and including rescheduling information for a resource where a resource used for the second traffic are excluded from the souse of sidelink for transmitting the first traffic.

The above configuration allows URLLC traffic to be transmitted preferentially, even when eMBB and URLLC traffics in a single SL transmit resource are multiplexed by performing a SL resource pre-emption process and indication, without causing a transmission collision. In other words, in inter-terminal direct communication, information pertaining to scheduling according to the traffic type can be indicated.

(Supplement to Embodiments)

While the embodiment of the present invention has been described above, the disclosed inventions are not limited to the embodiment, and it could be understood by those skilled in the art that various modifications, corrections, alternatives, replacements, and the like can be made thereto. While specific numerical examples have been used to facilitate understanding of the invention, the numerical values are just an example and appropriate values may be used, unless otherwise specified. Divisions of the described items in the above description are not essential to the present invention, and details described in two or more articles may be combined for use if necessary, or details of a certain article may be applied to details described in another article (unless incompatible). The boundaries of the functional units or the processing units in the functional block diagrams do not necessarily correspond to boundaries of physical components. The operations of two or more functional units may be performed by a single physical component or the operation of a single functional unit may be performed by two or more physical components. Regarding the processing procedure described in the embodiment, the order of processing may be changed as long as there is no contradiction. For convenience of processing explanation, the base station device 10 and the user device 20 have been described using the functional block diagrams, but such devices may be embodied in hardware, software, or a combination thereof. Software operating by the processor of the base station device 10 according to the embodiment of the present invention and software operating by the processor of the user device 20 according to the embodiment of the present invention may be respectively stored in a random access memory (RAM), a flash memory, a read only memory (ROM), an EPROM, an EEPROM, a register, a hard disk (HDD), a removable disk, a CD-ROM, a database, a server, or any other appropriate storage medium.

In addition, notification of information is not limited to the aspect/embodiment described in the specification, but may be performed using another manner. For example, the notification of information may be performed using physical layer signaling (for example, downlink control information (DCI) or uplink control information (UCI)), upper layer signaling (for example, radio resource control (RRC) signaling, medium access control (MAC) signaling, or broadcast information (master information block (MIB) and system information block (SIB))), other signals, or combinations thereof. In addition, the RRC signaling may be referred to as an RRC message and may be, for example, an RRC connection setup message, an RRC connection reconfiguration message or the like.

The aspect/embodiment described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended.

The processing procedures, the sequences, the flowcharts, and the like of the aspects/embodiments described in the specification may be changed in the order as long as they are not incompatible with each other. For example, in the method described in the specification, various steps are described in an exemplary order and the method is not limited to the described specific order.

Specific operations which are performed by the base station device 10 in the specification may be performed by an upper node thereof in some cases. In a network including one or more network nodes including the base station device 10, various operations which are performed to communicate with the user device 20 can clearly be performed by the base station device 10 and/or network nodes (for example, an MME or an S-GW can be considered but the network nodes are not limited thereto) other than the base station device 10. A case in which the number of network nodes, other than the base station device 10, is one has been described above; however, a combination of plural different network nodes (for example, an MME and an S-GW) may be used.

The respective aspects/embodiments described in the specification may be used alone, may be used in combination, or may be switched with implementation thereof.

The user device 20 (UE 20) may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several appropriate terms by those skilled in the art.

The base station device 10 may be referred to as a NodeB (NB), an evolved NodeB (eNB), a base station, gNB or some other appropriate terms by those skilled in the art.

As used in the specification, the terms "determining" and "deciding" may include various types of operations. For example, "determining" and "deciding" may include deeming that to perform judging, calculating, computing, processing, deriving, investigating, looking up (for example, search in a table, a database, or another data structure), or ascertaining is to perform "determining" or "deciding". In addition, "determining" and "deciding" may include deeming that to perform receiving (for example, reception of information), transmitting (for example, transmission of information), input, output, or accessing (for example, accessing data in memory) is to perform "determining" or "deciding". Further, "determining" and "deciding" may include deeming that to perform resolving, selecting, choosing, establishing, comparing, or the like is to perform "determining" or "deciding". Namely, "determining" and "deciding" may include deeming that some operation is to perform "determining" or "deciding".

As used in the specification, an expression "based on" does not refer to "based on only," unless otherwise specified. In other words, the expression "based on" refers to both "based on only" and "based on at least."

So long as terms "include" and "including" and modifications thereof are used in the specification or the appended claims, these terms are intended to have a comprehensive meaning similar to a term "comprising." A term "or" which is used in the specification or the claims is intended not to mean an exclusive or.

In the entire disclosure, for example, when an article such as a, an, or the is added in translation into English, such an article may refer to including the plural unless otherwise recognized from the context.

In the embodiment of the present invention, the eMBB traffic is an example of the first traffic. The URLLC traffic is an example of the second traffic. The SL resource pre-emption indication is an example of the sidelink pre-emption indication. The user device 20 with scheduling capability is an example of the first user device. The receiving user device 20 is an example of the second user device.

Although the present invention is described above in detail, it is obvious to those skilled in the art that the present invention is not limited to the embodiment described in the specification. The present invention can be implemented as modifications and alterations without departing from the gist and scope of the present invention defined in claims set forth below. Accordingly, the description of the specification is intended to be exemplary and does not have any restrictive meaning to the present invention.

EXPLANATIONS OF LETTERS OR NUMERALS

10 Base station device
110 Transmission unit

120 Reception unit
130 Configuration unit
140 Control unit
20 User device (UE)
210 Transmission unit
220 Reception unit
230 Configuration unit
240 Control unit
1001 Processor
1002 Storage unit
1003 Auxiliary storage unit
1004 Communication unit
1005 Input unit
1006 Output unit

The invention claimed is:

1. A terminal comprising:
a receiver that receives, from a first terminal and by one slot, first sidelink control information including:
information indicating that a first resource is to be used from among candidate resources to be used for transmission by the terminal, and
information indicating a traffic type;
a processor that determines whether to exclude the first resource from the candidate resources, based on the information indicating the traffic type; and
a transmitter that performs transmission to a second terminal by using a resource from among the candidate resources from which the first resource is excluded, in a case where the processor determines the exclusion of the first resource,
wherein the candidate resources other than the first resource are non-persistent sidelink resources scheduled by sidelink grant indicated by second sidelink control information prior to the first sidelink control information,
wherein, upon detecting pre-emption of the first resource by a physical layer, the processor excludes the first resource from the candidate resources,
wherein the information indicating the traffic type indicates priority, and
wherein the first resource is an entire single-slot resource.

2. A communication method to be executed by a terminal, the communication method comprising:
receiving, from a first terminal and by one slot, first sidelink control information including:
information indicating that a first resource is to be used from among candidate resources to be used for transmission by the terminal, and
information indicating a traffic type;
determining whether to exclude the first resource from the candidate resources, based on the information indicating the traffic type;
performing transmission to a second terminal by using a resource from among the candidate resources from which the first resource is excluded, in a case where the exclusion of the first resource is determined,
wherein the candidate resources other than the first resource are non-persistent sidelink resources scheduled by sidelink grant indicated by second sidelink control information prior to the first sidelink control information,
wherein, upon detecting pre-emption of the first resource by a physical layer, the first resource is excluded from the candidate resources,
wherein the information indicating the traffic type indicates priority, and
wherein the first resource is an entire single-slot resource.

* * * * *